United States Patent
Furlotti (10) Patent No.: US 11,628,957 B2
(45) Date of Patent: Apr. 18, 2023

(54) STATION FOR FEEDING CLOSING SEALS AND METHOD OF SEALING CONTAINERS FOR A PACKAGING LINE

(71) Applicant: I.M.A. INDUSTRIA MACCHINE AUTOMATICHE S.P.A IN SIGLA IMA S.P.A., Ozzano dell'Emilia (IT)

(72) Inventor: Filippo Furlotti, Traversetolo (IT)

(73) Assignee: I.M.A. INDUSTRIA MACCHINE AUTOMATICHE S.P.A IN SIGLA IMA S.P.A., Ozzano dell'Emilia (IT)

( * ) Notice: Subject to any disclaimer, the term of this patent is extended or adjusted under 35 U.S.C. 154(b) by 279 days.

(21) Appl. No.: 16/482,082

(22) PCT Filed: Feb. 8, 2018

(86) PCT No.: PCT/EP2018/053209
§ 371 (c)(1),
(2) Date: Jul. 30, 2019

(87) PCT Pub. No.: WO2018/146212
PCT Pub. Date: Aug. 16, 2018

(65) Prior Publication Data
US 2020/0247566 A1    Aug. 6, 2020

(30) Foreign Application Priority Data
Feb. 10, 2017 (IT) .................. 102017000014689

(51) Int. Cl.
*B65B 7/28* (2006.01)
*B65B 35/18* (2006.01)
(Continued)

(52) U.S. Cl.
CPC ............ *B65B 7/2807* (2013.01); *B65B 43/50* (2013.01); *B29C 51/266* (2013.01); *B29L 2031/712* (2013.01)

(58) Field of Classification Search
CPC ...... B65B 7/2807; B65B 35/18; B65G 47/848
(Continued)

(56) References Cited

U.S. PATENT DOCUMENTS 3,964,237 A    6/1976  Johansen
4,297,828 A  * 11/1981  Krieger ................. B65B 7/2807
                                                          53/276
(Continued)

FOREIGN PATENT DOCUMENTS

CN    102020224 A    4/2011
DE     1561995 A1    7/1970

OTHER PUBLICATIONS

International Search Report dated Apr. 10, 2018 re: Application No. PCT/EP2018/053209, pp. 1-3, citing: U.S. Pat. No. 4,816,110 A and DE 15 61 995 A1.

(Continued)

*Primary Examiner* — Thanh K Truong
*Assistant Examiner* — Patrick B Fry
(74) *Attorney, Agent, or Firm* — Cantor Colburn LLP (57) ABSTRACT

A station for feeding closing seals for containers includes at least one fixed magazine of seals which is provided with an outlet from which the seals can be taken individually. The station further includes a carousel for feeding seals which can rotate with respect to a first central rotation axis and is provided with pickers which are radially spaced apart from the first rotation axis. The pickers are individually rotatable about a second rotation axis which is not parallel to the first axis of the carousel. During rotation of the carousel, at least one picker is configured to rotate about the second axis from a position for taking the seal from the magazine to a position for releasing the seal.

12 Claims, 5 Drawing Sheets

(51) Int. Cl.
*B65B 43/50* (2006.01)
*B65G 47/84* (2006.01)
*B29C 51/26* (2006.01)
*B29L 31/00* (2006.01)

(58) Field of Classification Search
USPC .............. 53/485, 307, 282, 308; 198/397.04, 198/397.05; 156/567
See application file for complete search history.

(56) References Cited

U.S. PATENT DOCUMENTS

| | | | | |
|---|---|---|---|---|
| 4,816,110 A | * | 3/1989 | Foldesi | B65B 7/2807 53/DIG. 2 |
| 5,157,897 A | * | 10/1992 | McKee | B67B 3/2033 53/308 |
| 6,094,890 A | | 8/2000 | Michellon et al. | |
| 6,115,992 A | * | 9/2000 | Bankuty | B65B 7/2835 53/308 |
| 7,194,849 B2 | * | 3/2007 | Komp | B65B 43/30 53/284.7 |
| 10,144,541 B2 | * | 12/2018 | Rea | B65B 29/022 |
| 2016/0009427 A1 | * | 1/2016 | Rea | B65G 47/848 53/282 |

OTHER PUBLICATIONS

IT Search Report dated Sep. 29, 2017 re: Application No. IT 2017000014689, pp. 1-8, citing: U.S. Pat. No. 4,816,110 A and DE 15 61 995 A1.
Written Opinion dated Apr. 10, 2018 re: Application No. PCT/EP2018/053209, pp. 1-5, citing: U.S. Pat. No. 4,816,110 A and DE 15 61 995 A1.

* cited by examiner

STATION FOR FEEDING CLOSING SEALS AND METHOD OF SEALING CONTAINERS FOR A PACKAGING LINE

TECHNICAL FIELD

The present disclosure relates to a station for feeding container closing seals and to a method of sealing containers for a packaging line, particularly an FFS (form-fill-seal) packaging line.

BACKGROUND

Conventional solutions are based on linear machines, such as for example the one described in U.S. Pat. No. 6,094,890. These solutions however have a series of limitations that are associated precisely with deployment in a production line. One of these limitations, for example, is an extremely low flexibility owing to the fact that the machine spacing is linked to the diameter of the containers, so that, when it becomes necessary to modify the latter, the machine has to be subjected to extensive modifications, which affect especially the overall length of the machine, with the consequence that a machine designed to work on containers that have a certain diameter cannot work on containers with a larger diameter, except at the expense of adaptations that are entirely uneconomical or incompatible with the space originally allocated to the machine.

It is known from U.S. Pat. No. 3,964,237 to provide a thermoforming line in which, in order to obtain thermoformed containers, thermoplastic sheet-like blanks are used, in particular disks, which are individually heated, molded, filled and closed without resorting to die-punching.

The advantage of the solution known from U.S. Pat. No. 3,964,237 is that, differently from other conventional solutions which entail molding a plurality of containers on a sheet of thermoplastic material fed by a spool, the volume occupied by such spool is considerably greater than that occupied by the sheet-like blanks of U.S. Pat. No. 3,964,237 in order to obtain the same number of containers.

A drawback of the solution known from U.S. Pat. No. 3,964,237 is that it operates at low speeds. In particular, the rotating platter that supports the sheet-like blanks in U.S. Pat. No. 3,964,237 operates intermittently, in order to allow the sheet-like blanks arranged along the peripheral region of the rotating platter to be processed at fixed processing stations arranged about the perimeter of the platter, in particular stations for heating, drawing and sealing.

The operation and the speed of the solution in U.S. Pat. No. 3,964,237 are therefore limited by the fixed position of the peripheral processing stations.

U.S. Pat. No. 4,816,110 discloses an in-line sealer apparatus including a rotatable turret having a stack of foils that rotates together with the turret and a movable foil-engaging head for removing the lowermost foil in the stack and for transferring the foil and applying it to the mouth of the container positioned within a respective pocket of the turret.

SUMMARY

The aim of the present disclosure is to provide a station for feeding container closing seals and a corresponding method that are capable of improving the prior art in one or more of the aspects indicated above.

Within this aim, the disclosure provides a station for feeding container closing seals and a corresponding method that enable a continuous supply of seals, without the need for the container to be sealed to be stopped at the station for feeding seals.

The disclosure further provides a station for feeding container closing seals and a corresponding method that can be used in an FFS (form-fill-seal) packaging line.

Furthermore, the present disclosure overcomes the drawbacks of the prior art in a different manner to any existing solutions.

Still further, the disclosure provides a station for feeding container closing seals and a corresponding method that are highly reliable, easy to implement and low cost.

This aim and these and other advantages which will become better apparent hereinafter are achieved by providing a station for feeding closing seals for closing containers, characterized in that it comprises at least one fixed magazine of seals which is provided with an outlet from which said seals can be taken individually, said seal feeding station comprising a carousel for feeding seals which can rotate with respect to a first central rotation axis and is provided with a plurality of pickers which are radially spaced apart from said first rotation axis, said pickers being furthermore individually rotatable about a second rotation axis which is not parallel to said first rotation axis of the carousel, so that during the rotation of the carousel at least one picker can rotate about the second axis from a seal picker position, in which the pickup faces said outlet of the magazine in order to take a respective seal, to a position for releasing the seal, in which the picker is in an angularly spaced apart position around said second rotation axis with respect to said pick-up picker and in which the pickup releases said seal.

The aim and the advantages of the disclosure are likewise achieved by providing a method of sealing containers, wherein the method including the following steps:

providing at least one fixed magazine of seals which is provided with an outlet and with a carousel for feeding seals which can rotate with respect to a first central rotation axis and is provided with a plurality of pickers which are radially spaced apart around said first rotation axis, said pickers being furthermore individually rotatable about a second rotation axis which is not parallel to said first rotation axis of the carousel;

rotating said carousel for feeding seals with a continuous motion about said first axis;

during said rotation of the carousel, picking up a seal from said outlet by way of a respective picker of said plurality of pickers;

during said rotation of the carousel, rotating said pickup about said second axis to a release position;

during said rotation of the carousel, releasing said seal to a sealing carousel that is laterally adjacent to said carousel for feeding seals.

BRIEF DESCRIPTION OF THE DRAWINGS

Further characteristics and advantages of the disclosure will become better apparent from the description of a preferred, but not exclusive, embodiment of the station for feeding seals according to the disclosure, which is illustrated by way of non-limiting example in the accompanying drawings wherein.

DETAILED DESCRIPTION OF THE DRAWINGS

With reference to FIGS. 1-5, a line for packaging containers fillable with loose material using thermoforming, generally designated by the reference numeral 1, comprises a magazine 2 of thermoplastic sheet-like blanks G, station 3 for feeding the blanks to a subsequent station 4 for heating the blanks, a station 5 for thermoforming containers starting from such blanks, and a station 6 for filling the containers with the loose material, station 7 for sealing the filled containers by way of seals supplied by a station for feeding seals 9.

The thermoplastic sheet-like blanks G comprise, or are entirely constituted by, a "token" of thermoformable plastic material, for example a thermoplastic polymer, preferably of the type suitable for foods, such as PS, HIPS, PET or the like. Generally, each blank G can have any shape in plan view, for example round, square, rectangular, oval, polygonal, that corresponds to the plan of the final container that it is desired to provide or of the rim of its mouth. In the preferred and illustrated embodiment, each blank G is adapted to the formation of a single container and has, but is not limited to, a disk-like shape.

Preferably, the containers obtained with the thermoforming station 5 are tubs, adapted for example to be filled in the filling station 6 with an edible substance in the form of a particulate or a fluid, for example with yogurt, in order to be then sealed with "peelable" sheet covers (for example plastic/aluminum laminates), which are referred to hereinafter as closing seals.

The station for feeding closing seals 9 comprises at least one fixed magazine of seals 901 and more preferably a plurality of magazines of seals 900, each one containing a plurality of closing seals 90, for example stacked, and provided with a respective outlet 902 from which the seals 90 can be taken individually. In the present description the seals 90 are also identified with "S" for short.

The magazines 900 can be rendered fixed, for example, by mounting them on a supporting surface which is in turn fixed in a cantilever fashion to an upright of the packaging line 1.

In the embodiment shown, the outlets 902 of the magazines of seals 900 are adapted to keep the seal 90 individually extractable from each one of them in a substantially horizontal position.

Since the seals 90 are preferably stacked in the respective magazines 900 along a substantially vertical direction extending away from the outlet 902, the downward-most seal of the stack, i.e. the one that is extracted from the respective outlet 902, is substantially parallel to the floor on which rests the feeding station 9.

Figure 1:
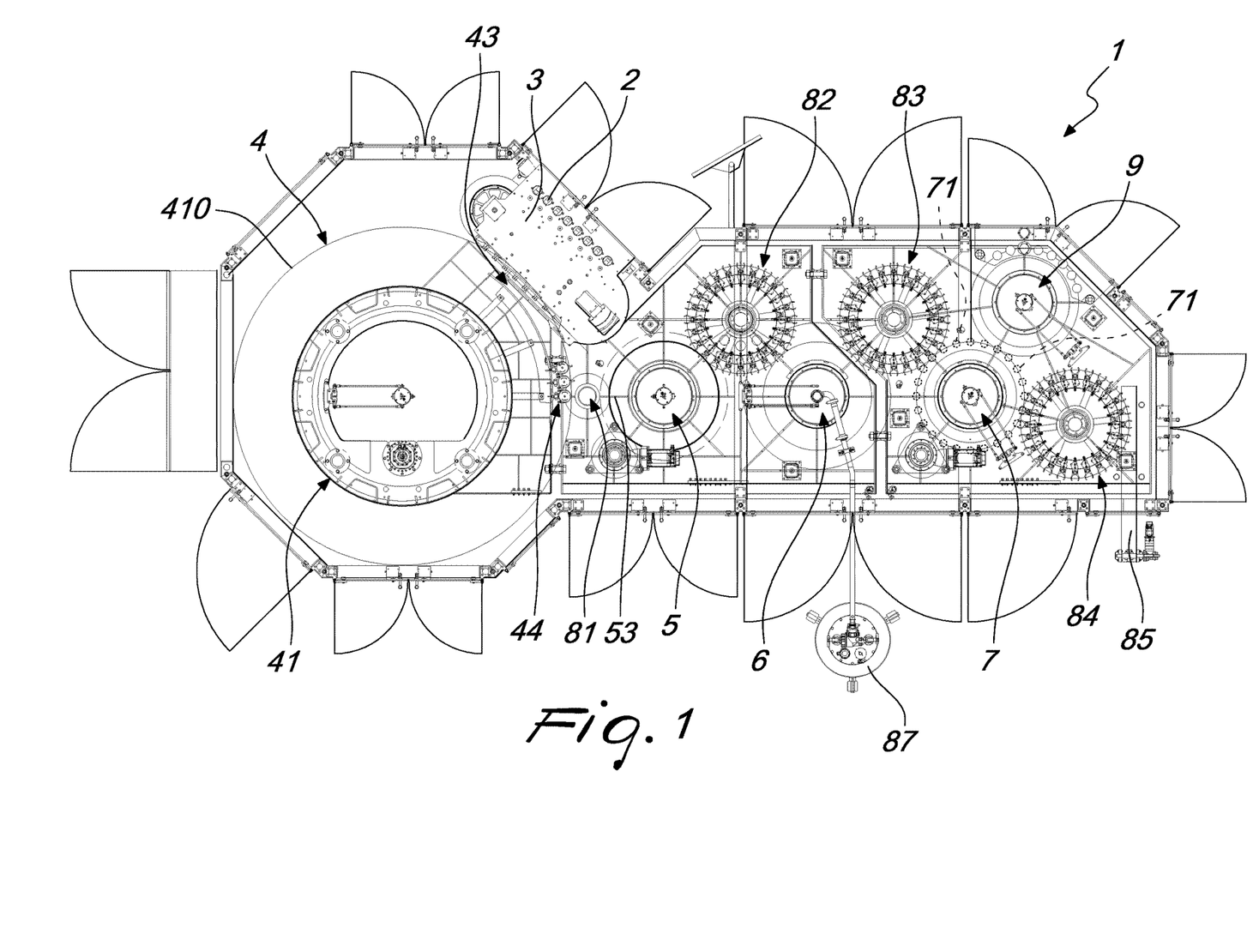
FIG. 1 is a plan view of an FFS (form-fill-seal) packaging line that comprises a station for feeding seals according to the disclosure.
Figure 2:
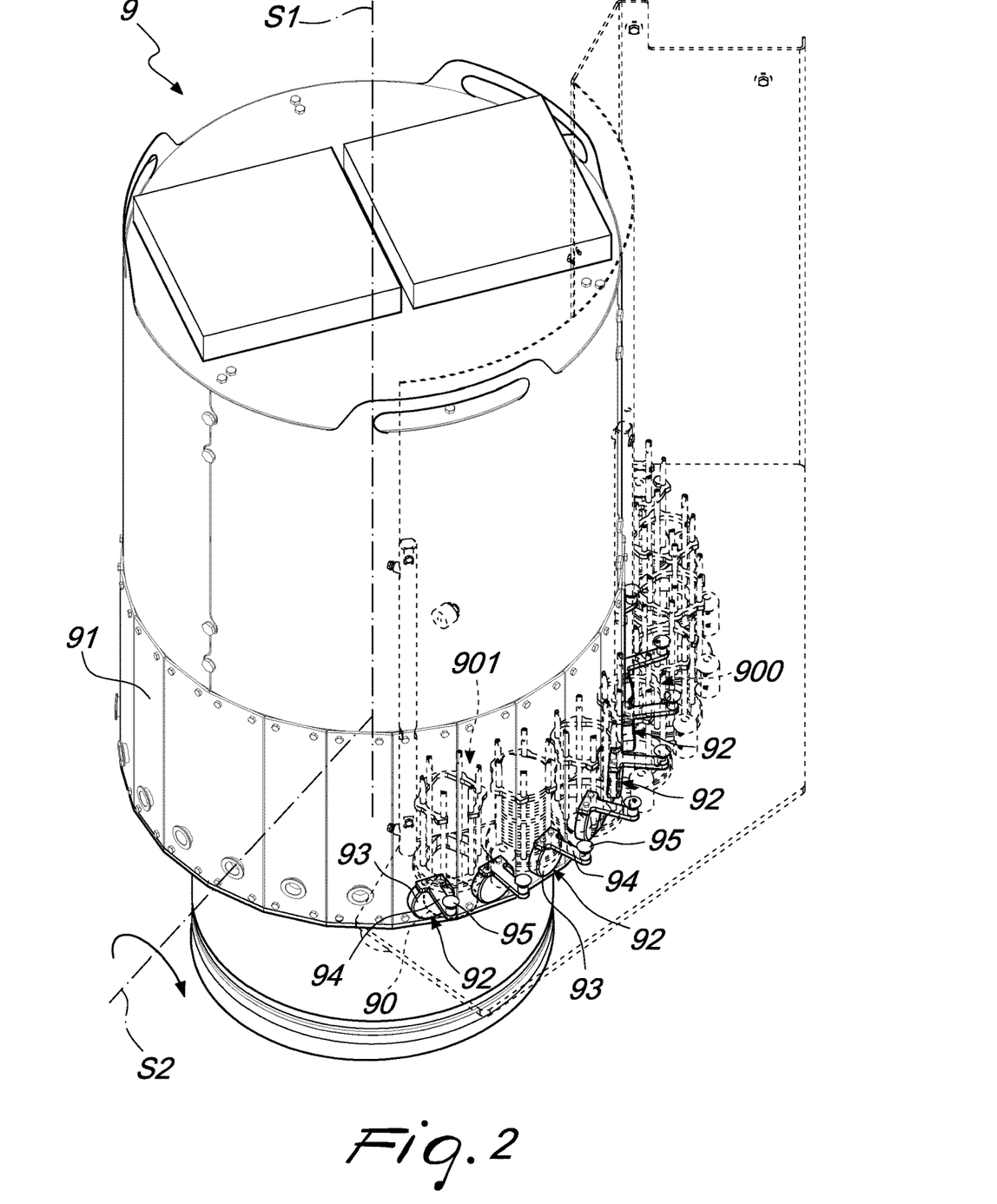
FIGS. 2-5 are perspective views of the carousel of the station for feeding seals in the various angular positions, from the position for picking up a seal (FIG. 2) to the position for releasing the seal (FIG. 5).
Figure 3:
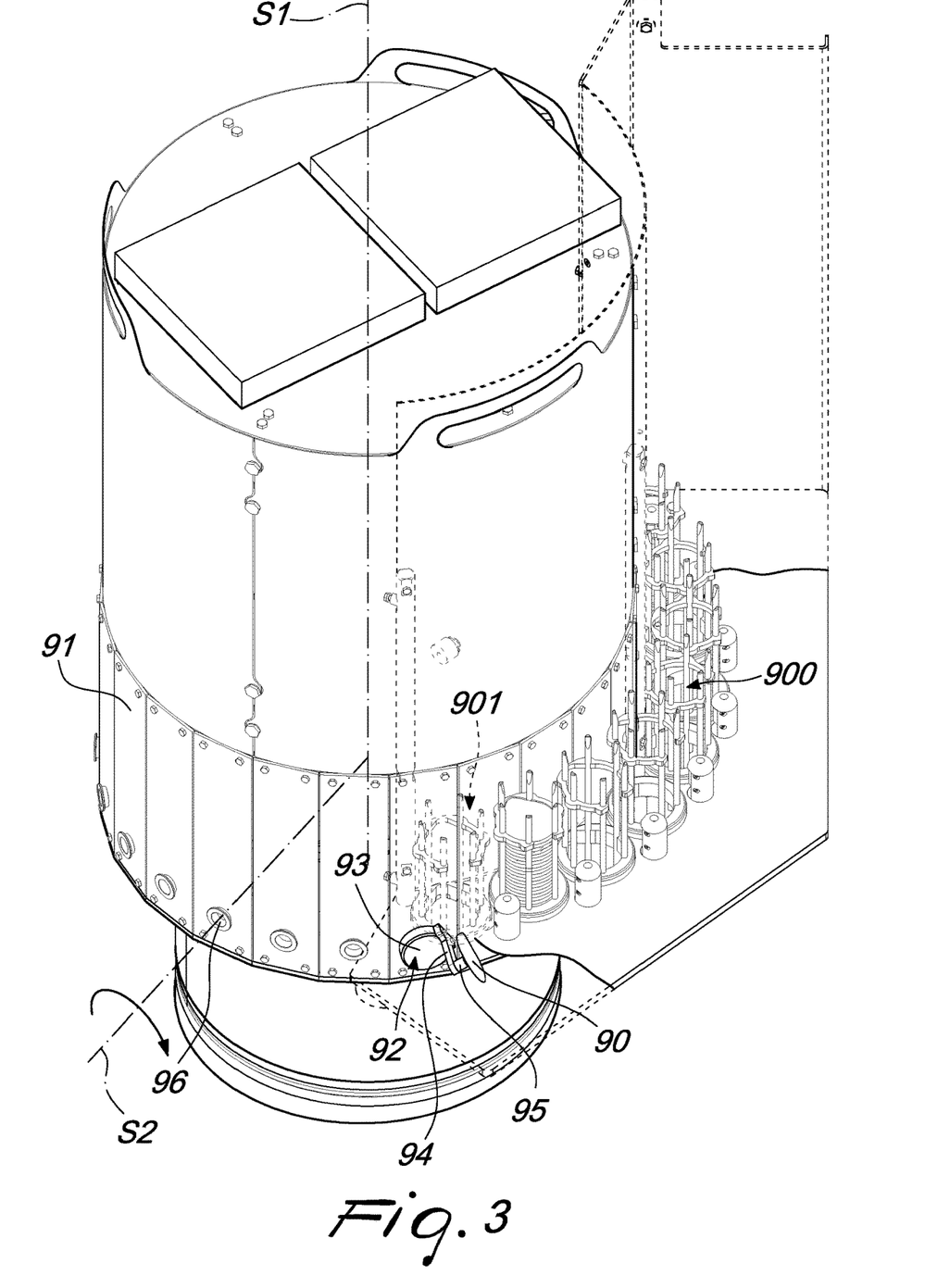
Figure 4:
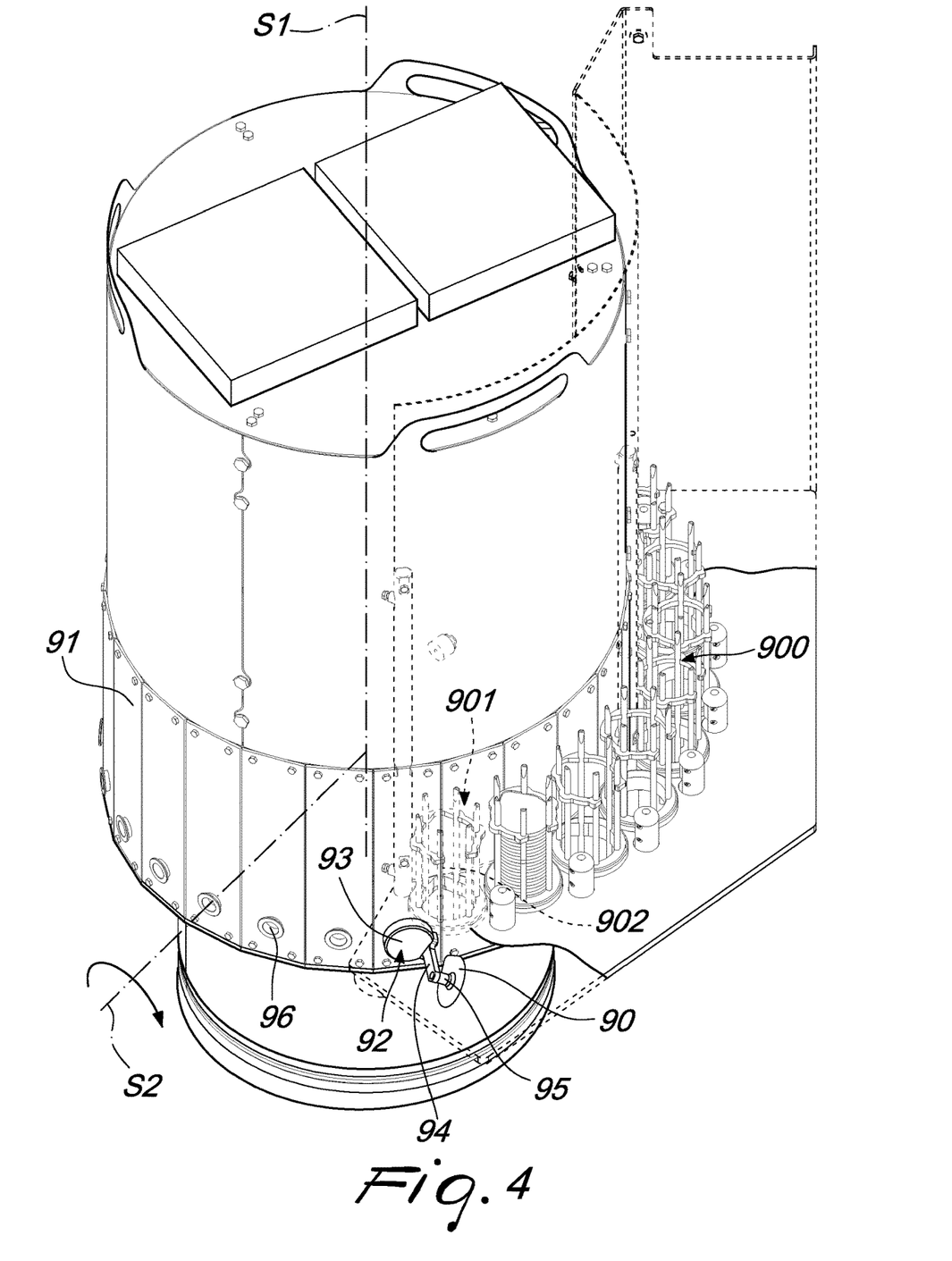
Figure 5:
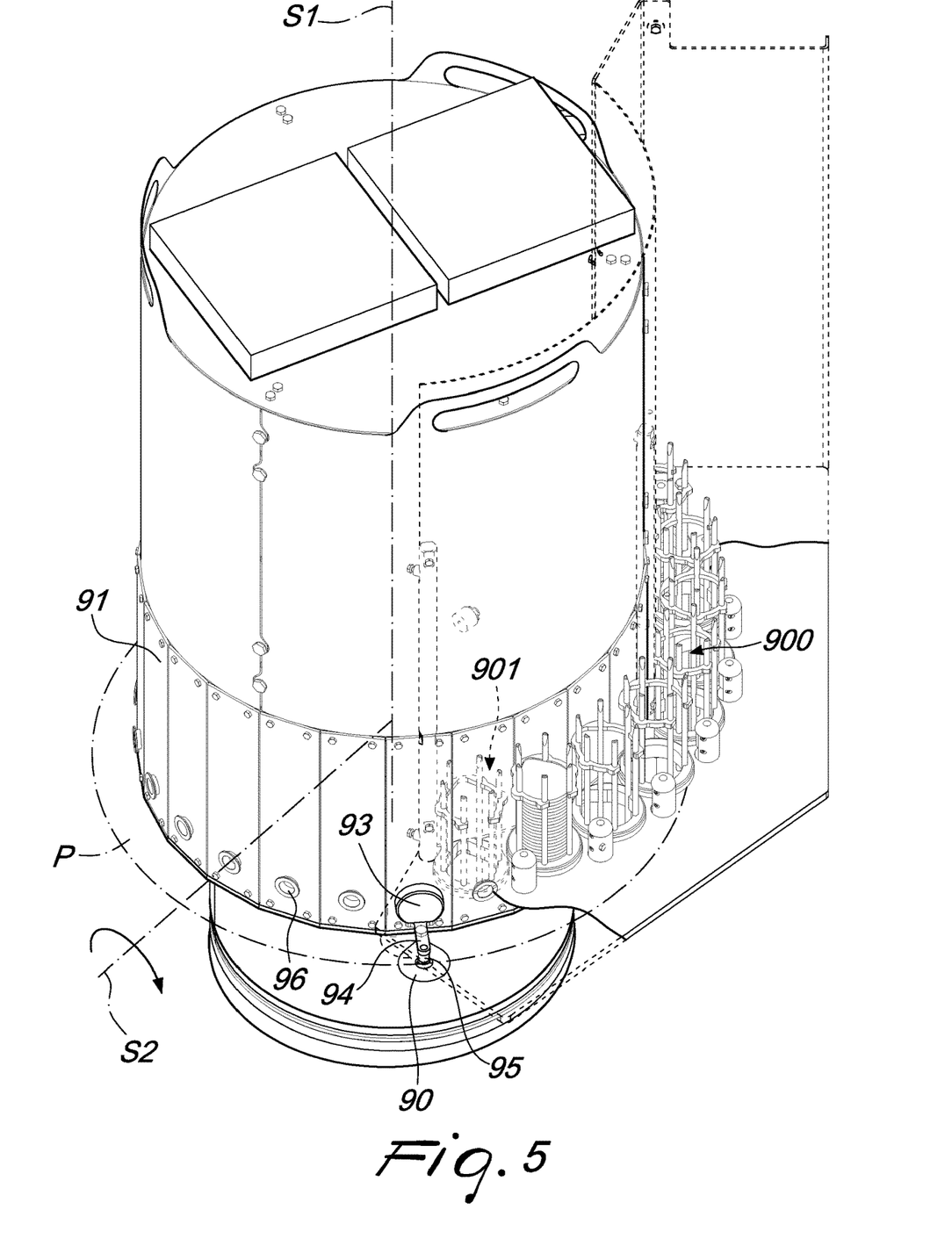

A carousel for feeding seals 91 is furthermore provided, which can rotate with respect to a first central rotation axis S1 and is provided with a plurality of pickers 92 which are radially spaced apart from the first rotation axis S1 and are arranged at regular angular distances about such axis S1. Only one of such pickers 92 is shown in the drawings while a number of such pickers 92 in the pick-up position are shown in FIG. 2.

The orthogonal projection of the pickers 92 on a plane perpendicular to the first rotation axis S1 defines a circumference, indicated here as the pitch circle of the carousel S1.

The pickers 92 can individually rotate about a second rotation axis S2 which is not parallel to the first rotation axis S1 of the carousel 91, but is oriented transversely to such first axis S1 and more preferably perpendicularly or radially to such first axis S1. In this manner, during the rotation of the carousel 91, at least one picker 92 is adapted to be rotated from a position for picking up the seal 90 from a magazine 901, in which the picker 92 is facing the outlet 902 of such magazine 901 in order to extract a respective seal 90 which is arranged parallel to the plane of rotation of the carousel 91, to a position for releasing the seal 90, in which the picker 92 is in an angularly spaced apart position about the second rotation axis S2 with respect to the pick-up position and in which the picker 92 releases the seal 90 that was previously taken from the outlet 902 of the magazine 901.

The pitch circle of the carousel for feeding seals 91 preferably intersects the pitch circle of another carousel present in the sealing station 7 in at least one point in which the pickers 92 are in the release position, so as to be able to release the seals 90 to the carousel of the sealing station 7.

Advantageously, each picker 92 is defined by an L-shaped arm 94 which ends with a sucker 95 and is fixed on the peripheral region of a disk which is pivoted in a hole 96 along the perimeter of the carousel 91. Such disk is coupled to suitable rotation means, not shown, for example to a respective brushless motor which is connected to a controller which commands all the brushless motors of the pickers 92.

The controller is conveniently programmed to actuate the brushless motors so as to make each picker 92, and in particular the suckers 95, along an arc of the pitch circle of the carousel 91, describe a portion of a cycloid from the pick-up position of the seal 90 to the release position of that same seal 90. In particular, the outlet 902 of the respective magazine 901 is arranged at, or facing toward, a cusp of said cycloid, so that in the pick-up position of the seal 90 the picker 92 can extract a seal 90 from the outlet 902 at substantially nil instantaneous speed. The portion of cycloid described is substantially a semicycloid, i.e. the seal 90 is subjected to a rotation of 180 degrees about the axis S2 by the picker 92 so as to be released to the sealing station 7 in a horizontal position and overturned with respect to the position that the seal 90 had in the magazine 901.

Advantageously, the magazines 900 are mutually angularly spaced apart according to angles identical to the angular distance of the pickers 92 along the pitch circle of the carousel 91 so that a plurality of pickers 92 can be located simultaneously in the pick-up position under a corresponding magazine and thus a plurality of seals 90 can be picked up simultaneously during the rotation of the carousel 91.

The means for rotating the pickers 92 are therefore configured to make a number of pickers 92 corresponding to the number of magazines 900 of the station for feeding seals 9 simultaneously describe a semicycloid so that the respective cusps of the semicycloids described will be located at, or facing, the respective outlets 902 of the magazines 900.

Operation of the disclosure is evident from the description of the structure. In particular, during the continuous rotation of the carousel for feeding seals 91 about the first axis S1, a set of adjacent pickers 92 are located with the sucker 95 directed upward and these pick up a respective seal 90 from the outlet 902 of a respective fixed magazine.

Following a command of the controller, each one of these pickers 92 rotates about the second axis S2, without the carousel 91 stopping, and the suckers 95 therefore describe a semicycloid path until they are brought to an angle of 180 degrees away from that of the pick-up position and the rotation of the picker about the second axis S2 is stopped, while the carousel 91 continues rotating about the first axis S1.

In this condition the seals 90 picked up are now hung from the suckers 95 and can be released to the adjacent carousel of the sealing station 7, the rotation of which is obviously synchronized with that of the carousel for feeding seals 91. The release can occur by pneumatically removing the partial vacuum between the sucker 95 and the seal 90, in a way that is known per se.

In practice it has been found that the disclosure fully achieves the intended aim and objects, by providing a station for feeding seals that makes it possible to feed seals stored in a fixed position to a sealing carousel 7 that rotates with continuous motion and which comprises a plurality of sealing heads 71 along its peripheral region which are adapted to stably couple a closing seal on a container.

The feeding station according to the disclosure can therefore advantageously be used in packaging lines of the rotary type and preferably in FFS (form-fill-seal) lines.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102017000014689 (UA2017A000849) from which this application claims priority are incorporated herein by reference.

The invention claimed is:

1. A seal feeding station for feeding closing seals for closing containers, the seal feeding station comprising: a plurality of magazines of seals, each magazine being provided with an outlet at the bottom from which said seals are taken individually, said seal feeding station comprising a seal feeding carousel for feeding seals configured to rotate with a continuous motion with respect to a first central rotation axis and is provided with a plurality of pickers radially spaced apart from said first rotation axis, said pickers being further individually rotatable about a second rotation axis which is not parallel to said first rotation axis of the seal feeding carousel, so that during the rotation of the seal feeding carousel at least one picker rotates about the second axis from a seal retrieving position, in which the picker faces said outlet at the bottom of the magazine in order to take a respective seal, to a release position for releasing the seal, in which the picker is rotated 180° around said second rotation axis with respect to said retrieving position and in which the picker releases said seal, wherein said magazines of seals are fixed with respect to said first rotation axis and said second rotation axis and are mutually angularly spaced apart at angles that correspond to an angular distance of said pickers along a pitch circle of said seal feeding carousel, wherein the seal feeding station comprises means for rotating the pickers which are configured so that, during the continuous rotation of said seal feeding carousel about said first rotation axis, a number of said pickers corresponding to said plurality of magazines are located simultaneously in the seal retrieving position at a corresponding magazine so that a plurality of seals are picked up simultaneously by said number of pickers.

2. The station for feeding seals according to claim 1, wherein said second rotation axis is directed substantially radially with respect to said first rotation axis.

3. The station for feeding seals according to claim 1, wherein said outlet of said at least one magazine of seals is adapted to keep the seal that is taken from said outlet in a position that is substantially parallel to a rotation plane of said carousel for feeding seals.

4. The station for feeding seals according to claim 1, wherein the means for rotating said pickers are adapted to rotate said pickers through 180 degrees about the second rotation axis from said retrieving position to said release position and vice versa.

5. The station for feeding seals according to claim 4, wherein the means for rotating said pickers are configured to make said pickers describe, along an arc of the pitch circle of said carousel for feeding seals, a portion of a cycloid from said retrieving position to said release position.

6. The station for feeding seals according to claim 5, wherein the outlet of each magazine is arranged at a cusp of said cycloid, so that in said retrieving position the picker extracts a seal from said magazine at substantially nil instantaneous speed.

7. The station for feeding seals according to claim 5, wherein said cycloid portion corresponds to a semi-cycloid.

8. The station for feeding seals according to claim 1, wherein each magazine comprises at least one portion in which said seals are stacked extending away from said outlet, said means for rotation of the pickers being configured to make said number of pickers that corresponds to said plurality of magazines simultaneously describe a cycloid portion, so that the respective cusps of the cycloid coincide with the respective outlets of the magazines.

9. A packaging line comprising: a sealing carousel for sealing containers which rotates with a continuous motion and which comprises a plurality of sealing heads along its peripheral region which are adapted to stably couple a closing seal on a container, the packaging line further comprising the seal feeding station for feeding seals according to claim 1, wherein the pitch circle of said seal feeding carousel for feeding seals intersects a pitch circle of said sealing carousel in at least one point in which at least one of said pickers of the seal feeding carousel for feeding seals is in the release position.

10. A method of sealing containers, the method including the following steps:
  providing a plurality of fixed magazines of seals, each of which is provided with an outlet at the bottom, and a seal feeding carousel for feeding seals which rotates with respect to a first central rotation axis and is provided with a plurality of pickers which are radially spaced apart around said first rotation axis, said magazines being mutually angularly spaced apart at angles that correspond to an angular distance of said pickers along a pitch circle of said seal feeding carousel, said pickers further being individually rotatable about a second rotation axis which is not parallel to said first rotation axis of the carousel,
  rotating said seal feeding carousel with a continuous motion about said first axis,
  during said rotation of the seal feeding carousel, rotating said pickers about said second rotation axis so that a number of said pickers is located simultaneously in the retrieving position at a corresponding one of said magazines and simultaneously retrieving a seal from each of said outlets by way of a respective picker of said number of pickers, whereby said number of fixed magazines of seals are fixed with respect to said first rotation axis and said second rotation axis, during said rotation of the seal feeling carousel, rotating said pickers about said second axis to a release position, and during said rotation of the seal feeding carousel, releasing said seals to a sealing carousel that is laterally adjacent to said seal feeding carousel.

11. The method of sealing containers according to claim 10, wherein said second axis is directed radially with respect to said first axis and the rotation of each picker entails an arc-like cycloid trajectory described by said picker from the seal retrieving position to the seal release position.

12. A seal feeding station for feeding closing seals for closing containers, the seal feeding station comprising a plurality of magazines of seals, each magazine being provided with an outlet at the bottom from which said seals are taken individually, said seal feeding station further comprising a seal feeding carousel for feeding seals which is configured to rotate with a continuous motion about a first central rotation axis and which is provided with a plurality of pickers radially spaced apart from said first rotation axis, said pickers being further individually rotatable about a respective second rotation axis which is directed radially with respect to said first rotation axis of the seal feeding carousel, so that during the continuous rotation of the seal feeding carousel about the first rotation axis the pickers rotate about the respective second rotation axis from a seal retrieving position, in which a number of said pickers corresponding to said plurality of magazines faces the outlet at the bottom of a respective magazine in order to simultaneously take a respective seal, to a release position suitable for releasing the seal, in which the pickers of said number of pickers are rotated 180° around said second rotation axis with respect to said retrieving position, wherein said magazines of seals are fixed with respect to said first rotation axis and said second rotation axis and are mutually angularly spaced apart at angles that correspond to an angular distance of said pickers along a pitch circle of said seal feeding carousel, wherein the seal feeding station further comprises means for rotating the pickers which are configured to make said number of pickers simultaneously describe a cycloid portion from said retrieving position to said release position, so that cusps of said cycloid coincide with the respective outlets of said magazines.

* * * * *